United States Patent [19]
Frank

[11] Patent Number: 4,713,032
[45] Date of Patent: Dec. 15, 1987

[54] SAILBOARDS AND SURFBOARDS AS WELL AS MANUFACTURING PROCESS THEREOF

[75] Inventor: Wolfgang Frank, Bruckmühl, Fed. Rep. of Germany

[73] Assignee: TAA Technique and Administration AG, Basel, Switzerland

[21] Appl. No.: 723,959

[22] PCT Filed: Aug. 9, 1984

[86] PCT No.: PCT/EP84/00240
§ 371 Date: Apr. 12, 1985
§ 102(e) Date: Apr. 12, 1985

[87] PCT Pub. No.: WO85/00755
PCT Pub. Date: Feb. 28, 1985

[30] Foreign Application Priority Data

Aug. 12, 1983 [DE] Fed. Rep. of Germany ....... 3329230

[51] Int. Cl.[4] ............................................. A63C 15/05
[52] U.S. Cl. ..................................... 441/74; 264/46.4
[58] Field of Search ...................... 441/74; 114/357; 264/45.4, 45.5, 46.6, 46.8, 511, 46.9

[56] References Cited

U.S. PATENT DOCUMENTS

| | | | |
|---|---|---|---|
| 3,464,935 | 9/1969 | Sepkoski et al. | 524/590 |
| 3,929,549 | 12/1975 | Smith | 156/245 |
| 4,120,632 | 10/1978 | Stoeberl | 264/46.8 X |
| 4,383,955 | 5/1983 | Rubio et al. | 264/46.6 |
| 4,389,454 | 6/1983 | Horacek et al. | 264/46.6 X |
| 4,455,340 | 6/1984 | Okina | 264/46.6 X |
| 4,531,922 | 7/1985 | Schütz | 441/74 |
| 4,551,290 | 11/1985 | Mizell | 441/74 X |
| 4,621,002 | 11/1986 | Kuhlmann et al. | 441/74 X |

FOREIGN PATENT DOCUMENTS

| | | | |
|---|---|---|---|
| 0069076 | 1/1983 | European Pat. Off. | |
| 3117066 | 11/1982 | Fed. Rep. of Germany | 441/74 |
| 2534188 | 4/1984 | France | 441/74 |
| 0188625 | 11/1983 | Japan | 441/74 |

Primary Examiner—Joseph F. Peters, Jr.
Assistant Examiner—Paul E. Salmon
Attorney, Agent, or Firm—Oblon, Fisher, Spivak, McClelland & Maier

[57] ABSTRACT

A method of making a sailboard or surfboard, in which a prefabricated foam core has fibrous material wound about it and a polyurethane resin especially set with a reaction retarder is poured onto the fibrous material, whereupon the thus treated foam core is inserted in a molding tool and the mold is closed for curing the polyurethane resin. Desirably, the mold is lined with a surface layer, particularly a deep drawn thermoplastic film, before the treated foam core is inserted. In this way one can make low-weight boards of high strength with relatively low production and material costs.

5 Claims, 2 Drawing Figures

SAILBOARDS AND SURFBOARDS AS WELL AS MANUFACTURING PROCESS THEREOF

The invention relates to a method of making sailboards or surfboards as well as to a sailboard or surfboard.

In a known method of this kind, a prefabricated EPS foam core has a glass fibre mat wound around it, is inserted in the mold and has epoxy resin painted or poured on it. Thereafter, the mold is closed so that the epoxy resin cures and, with the glass fiber mat, forms an impact resistant laminate. After removing the laminate from the mold, it is provided with a fine or gel layer which may, however, also be introduced in the mold already before the wound EPS foam core is inserted. This so-called epoxy technology permits laminates of high strength, low weight and good appearance to be produced.

Disadvantages with this known method are the high costs of the epoxy foam, the health hazard when processing same, and the relatively long cycle necessitated by the curing period for the epoxy foam and amounting to about 30 minutes.

The invention is based on the problem of improving a method according to the classifying portion of claim 1 so that laminates can be produced at lower costs and less health hazard with at least the same weight and strength as laminates made by the epoxy technique. It is also a problem of the invention to improve a sailboard or surfboard portion of claim 18 so that it has a low weight, high strength and low cost to produce.

To solve this problem, a method and a sailboard or surfboard of the aforementioned kind are suggested with the features of the invention mentioned in the characterising portion of the claims.

Surprisingly, it has been found that polyurethane resin that had hitherto been exclusively used as polyurethane foam for the cores of sailboards will, in conjunction with fibrous material and a suitable surface layer, result in a laminate which is very impact resistant and gives the board a high strength at a low weight. Polyurethane resin is much cheaper than epoxy resin and cures much more rapidly so that the lower cost of material and the shorter cycle periods give an overall cheaper production. In addition, its processing has fewer health hazards.

The polyurethane resin is preferably set by a reaction retarder so that there is a delay of several minutes, particularly about 10 minutes, in the chemical reaction of its components. There is then sufficient time to pour the resin onto the fiber-reinforced foam core and then insert the core in the mold and close the mold. If, in accordance with a development of the invention, the mold is then held at a temperature of about 80° C. during curing of the shell laminate, one obtains a curing time of about 5 minutes. When compared with a curing time of about 30 minutes required for epoxy resin, it will become evident that the production capacity per set of tools when using the method of the invention is considerably higher. One can expect 5 times the production capacity.

Preferably, the polyurethane resin is given a low foamability so that, despite the inevitable production tolerances for the prefabricated foam core, sufficient pressure is built up in the entire shell laminate zone and any isolated departures of the foam core surface from the desired measurements will be balanced out by thickness fluctuations in the shell laminate.

The surface layer may be a gel coating with which the mold is lined before insertion of the foam core covered with saturated fibrous material, as is known per se in epoxy technology.

According to a special embodiment of the invention, the surface layer is a film of thermoplastic material with which the mold is lined before insertion of the foam core reinforced with saturated fibrous material. With a thermoplastic film as surface layer, especially the impact strength of the shell increases. In addition, introduction of a thermoplastic film in the mould is easier from a production point of view than lining the mold with a gel coating because one can dispense with treating the mold wall with a parting compound and polishing it before introducing the surface layer.

Preferably, the film is introduced in the mold in a deep drawing process. It facilitates an optically attractive surface for the laminate, prevents any absorption of water by the laminate and also protects the laminate from ultra-violet radiation. Prior to the deep drawing process, the film may be printed with the desired design so that subsequent adhesion of decorative strips to the board surface is unnecessary. Nor is it necessary to pretreat the film for the subsequent application of a preservative lacquer.

Advantageous embodiments of the invention are the subject of additional subsidiary claims.

The invention will now be described in more detail with the aid of the description of examples with reference to the drawing, wherein.

Figure 1:
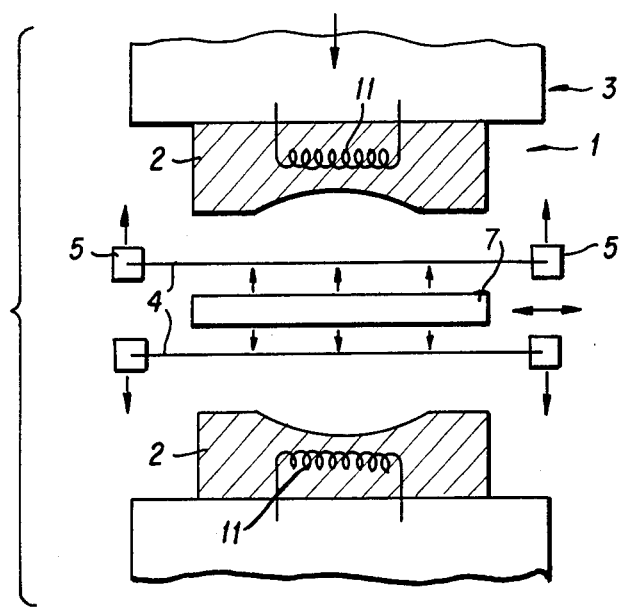
FIG. 1 is a diagrammatic representation of a mold tool.

The mold tool 1 shown in FIG. 1 consists of two mold segments 2 accommodated in a press 3.

Figure 2:
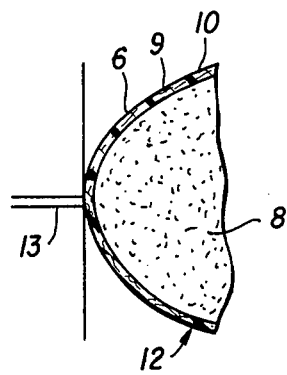
FIG. 2 is a part section of a laminate made and constructed according to the invention.

Two webs of film 4 are withdrawn from two superposed film reels and moved by means of clamping frames 5 at a certain spacing between the mould segments 2, where they assume the position shown in FIG. 2.

The film is of thermoplastic material intended to form the surface layer 6 of the FIG. 2 laminated. Suitable film materials are appropriate thermoplastic materials such as ABS (acrylonitrile-butadiene-styrene-copolymer), ASA (acrylic-rubber-styrene-acrylonitrile-copolymer), PC (polycarbonate) and PMMA (polymethylmethacrylate). The film thickness is between 0.1 and 0.5 mm, preferably 0.2 mm. The outer faces of the webs of film may already have the desired design printed on them.

As shown in FIG. 1, a heat radiator 7 is moved between the webs of film 4 to heat the film material to the converting temperature. When this has been reached, the two webs of film 4 are moved up or down to the associated mold segment by means of the clamping frames 5 and deep drawn by applying a vacuum. The heat radiator 7 is also withdrawn from the space between the mold segments 2.

On the other hand, a foam core 8 of EPS (Styropor) or PU (polyurethane) is first prefabricated and has fibrous mats or fibrous fabric 9 wound around it. Such mats are conventional and employ fibers such as glass, aramide, polyamide or carbon fibres. When the prefabricated foam core 8 has had one or more fibrous layers wound completely around it, fluid synthetic resin 10 is poured onto the fibrous mats at both sides of the core. Directly thereafter, the thus treated foam core 8 is inserted in the lower mold segment 2 in which the deep drawn web of film 4 is still held by vacuum, and the press is closed. The pressure of the press and a low foaming capacity of the synthetic resin causes the latter to be completely distributed in the space between the foam core 8 and the film 4 and cures to form a closed fiber-reinforced shell which comes into intimate connection with the film 4 and the foam core 8. The curing step takes place at a molding tool temperature of about 80° C. within about 5 minutes. Heating elements 11 for heating the molding tool are indicated in FIG. 1. If the mold is not heated, i.e. curing is at room temperature, the curing time is about 9 minutes.

After curing, the finished laminate 12 is removed from the molding tool 1. It is then only necessary to trim the projecting film edges 13 shown in FIG. 2. Thereafter, the cut faces are possibly sealed but they can be kept very narrow. This permits a cycle time of 20 minutes to be achieved, enabling about 24 boards to be made during an 8 hour shift.

The synthetic resin used to saturate the fibrous material 9 is a specially set polyurethane resin known to have an A component of polyalcohol and a B component of isocyanate. The B component has an additive of a reaction retarder which prmits the chemical reaction of the components to occur only after about 10 minutes. In addition, the polyurethane resin is given a low foaming capacity. In this way there will be adequate time available for applying the polyurethane resin to the foam core 8 having fibrous material wound around it and to insert the resulting structure into the molding tool and close same before the reaction starts. Pressing the film 4 to the foam core 8 together with the fibrous layer 9 saturated with polyurethane resin 10 in the manner described leads to an exceptionally impact resistant laminate having a high longitudinal strength and low weight.

The laminate may also be made without prior deep drawing of a film in the molding tool 1. Instead of the film 4, the mold can be lined with a fine layer or gel coating. For this purpose it is necessary first to clean the inside of the mold carefully, apply a parting compound to the surfaces and polish same. A gel coating is then sprayed on, rolled on or painted on. This layer cures within 5 to 15 minutes, whereupon the foam core with saturated fibrous material is inserted in the mould and pressed.

A third possibility is to make the laminate as described but without surface layer and to apply same later. For this purpose, use can be made of PU lacquer or DD lacquer, gel coating or lacquer on a polyester basis.

A method of making a sailboard or surfboard is described, in which a prefabricated foam core has fibrous material wound about it and a polyurethane resin specially set with a reaction retarder is poured onto the fibrous material, whereupon the thus treated foam core is inserted in a molding tool and the mold is closed for curing the polyurethane resin. Desirably, the mold is lined with a surface layer, particularly a deep drawn thermoplastic film, before the treated foam core is inserted. In this way, one can make low-weight boards of high strength with relatively low production and material costs.

I claim:

1. A sailboard or surfboard comprising a foam core and a shell of fiber-reinforced synthetic resin and a surface layer, characterized in that polyurethane resin is provided as synthetic resin and said surface layer is an intimately adhering deep drawn thermoplastic film with a thickness of 0.1 to 0.5 mm applied during the preparation of said sailboard or surfboard.

2. A board according to claim 1, characterized in that the polyurethane resin is slightly foamed.

3. A board according to claim 1 or 2 wherein said thermoplastic film has a thickness of 0.2 mm.

4. A board according to claim 1, characterized in that the foam core consists of Styropor or polyurethane foam.

5. A board according to claim 1, characterized in that the fibrous material consists of fibers of glass, aramide, polyamide, polyester or carbon.

* * * * *